(12) United States Patent
Matsumoto

(10) Patent No.: US 8,659,812 B2
(45) Date of Patent: Feb. 25, 2014

(54) WAVELENGTH SELECTIVE SWITCH

(75) Inventor: Koji Matsumoto, Hachioji (JP)

(73) Assignee: JDS Uniphase Corporation, Milpitas, CA (US)

( * ) Notice: Subject to any disclaimer, the term of this patent is extended or adjusted under 35 U.S.C. 154(b) by 78 days.

(21) Appl. No.: 13/419,622

(22) Filed: Mar. 14, 2012

(65) Prior Publication Data

US 2013/0155501 A1 Jun. 20, 2013

(30) Foreign Application Priority Data

Dec. 16, 2011 (JP) ................................. 2011-275812

(51) Int. Cl.
*G02B 26/08* (2006.01)
(52) U.S. Cl.
USPC ........................................ 359/225.1; 359/434
(58) Field of Classification Search
USPC ........ 359/434, 223.1, 225.1, 325; 398/48, 79, 398/87; 385/15–18, 24
See application file for complete search history.

(56) References Cited

U.S. PATENT DOCUMENTS 7,756,368 B2 * 7/2010 Garrett et al. ................... 385/18

FOREIGN PATENT DOCUMENTS

JP 2009-009073 1/2009

* cited by examiner

*Primary Examiner* — Euncha Cherry
(74) *Attorney, Agent, or Firm* — Matthew A. Pequignot; Pequignot + Myers LLC

(57) ABSTRACT

Provided is a wavelength selective switch, which includes: an input/output unit; a dispersive portion; a deflection portion; and an ovalization relay optical system. In the input/output unit, input/output portions are two-dimensionally arranged. The dispersive portion is capable of dispersing signal light along a first plane. The deflection portion deflects the signal light. The ovalization relay optical system condenses the signal light beams on to a first conjugate point. The ovalization relay optical system makes a beam waist forming position along a first direction coincide with the first conjugate point. The ovalization relay optical system condenses signal light, in a second direction, onto a first condensing point. The ovalization relay optical system makes the first condensing point conjugate to the first conjugate point. The ovalization relay optical system ovalizes the beam shape of the signal light beams incident on the deflection element.

10 Claims, 19 Drawing Sheets

FIG. 3
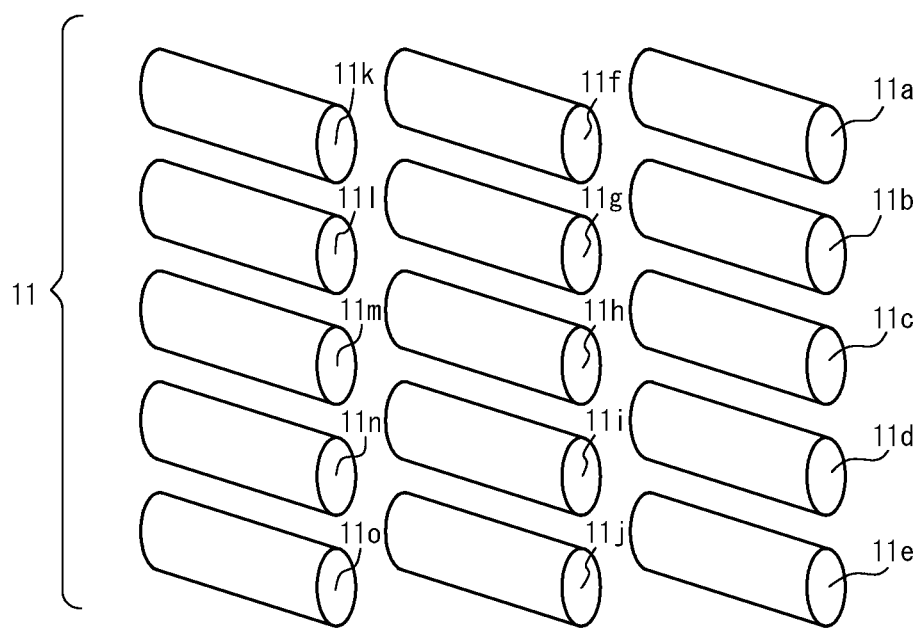
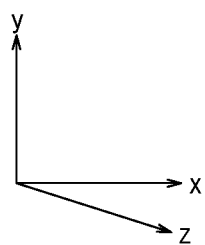

d ≪ D d ≑ D

WAVELENGTH SELECTIVE SWITCH

CROSS REFERENCE

The present application claims the priority of Japanese Patent Application No. 2011-275812 filed on Dec. 16, 2011, the content of which is incorporated herein by reference.

TECHNICAL FIELD

The present invention relates to a wavelength selective switch capable of diverging light of different wavelengths.

RELATED ART

Conventionally, there has been known to use a wavelength selective switch having a plurality of input/output optical ports for wavelength division multiplexing. Along with the recent development of large-scale networks, there are demands for a wavelength selective switch having a wide transmission band and a large number of input/output ports. Japanese Patent Publication No. 2009-009073 has been proposed a wavelength selective switch which uses a beam expander so as to condense beams in an elliptic shape on a deflection element, to thereby provide a broad transmission band.

SUMMARY OF THE INVENTION

Problems to be Solved by the Invention

The wavelength selective switch disclosed in Japanese Patent Publication 2009-009073 and a conventional wavelength selective switch both include a plurality of input/output ports which are arranged along a first direction perpendicular to all the dispersing directions of a plurality of light beams dispersed by the dispersive portion. In view of reducing the thickness of the wavelength selective switch, there is an upper limit to the number of input/output ports that are allowed to be arranged along the first direction. Therefore, it may be contemplated to arrange the input/output ports two-dimensionally, namely, along the first direction and also along a second direction perpendicular to the first direction, to thereby increase the number of the input/output ports.

However, when the input/output ports are arranged two-dimensionally, it has been difficult to reduce the thickness of the wavelength selective switch while simultaneously increasing the output efficiency of signal light.

The present invention has been made in view of the above-mentioned problems, and it is therefore an object of the invention to provide a wavelength selective switch capable of attaining a reduction in thickness while increasing the output efficiency of signal light at the same time, even with the output/input ports being arranged two-dimensionally.

Means for Solving the Problem

In order to solve the above-mentioned problems, a wavelength selective switch according to the present invention includes:

an input/output unit including a plurality of input/output portions arranged two-dimensionally for inputting or outputting wavelength-multiplexed signal light;

a dispersive portion capable of dispersing, along a first plane, the signal light input from the input/output portion in a direction corresponding to the wave length;

a deflection unit having a plurality of deflection elements for deflecting each of a plurality of signal light beams that are to be dispersed by the dispersive portion into wavelengths, so that the signal light beams are each made incident on different one of the input/output portions depending on the wavelength; and an ovalization relay optical system disposed between the input/output unit and the dispersive portion, the ovalization relay optical system including at least one first ovalization optical element and at least one second ovalization optical element, the first ovalization optical element having a refractive power in a first direction perpendicular to an optical axis which is larger than a refractive power in a second direction perpendicular to the optical axis and to the first direction, the second ovalization optical element having a refractive power in the second direction which is larger than a refractive power in the first direction, the first ovalization optical element and the second ovalization optical element being arranged so that the first direction becomes perpendicular to the first plane, the ovalization relay optical system condensing signal light beams that are to be input from all the input/output portions, onto a first conjugate point, the first conjugate point being closer to the ovalization relay optical system between the deflection unit and the ovalization relay optical system, than any other conjugate points that are conjugate to the deflection unit;

the ovalization relay optical system making a beam waist forming position along the first direction of signal light beams emitted from the ovalization relay optical system to the dispersive portion side coincide to the first conjugate point;

the ovalization relay optical system condensing, in the second direction, the signal light beams that are to be input from all the input-output portions onto the first condensing point in the ovalization relay optical system, and making the first condensing point conjugate to the first conjugate point; and the ovalization relay optical system ovalizing a beam shape of the signal light beams being incident on the deflection element.

Effect of the Invention

The wavelength selective switch according to the present invention configured as described above is capable of increasing output efficiency of signal light while simultaneously reducing the thickness of the wavelength selective switch.

BRIEF DESCRIPTION OF THE DRAWINGS

FIG. 3 is a layout illustrating how the input/output units are arranged in the input/output unit;

DETAILED DESCRIPTION OF THE INVENTION

Figure 1:
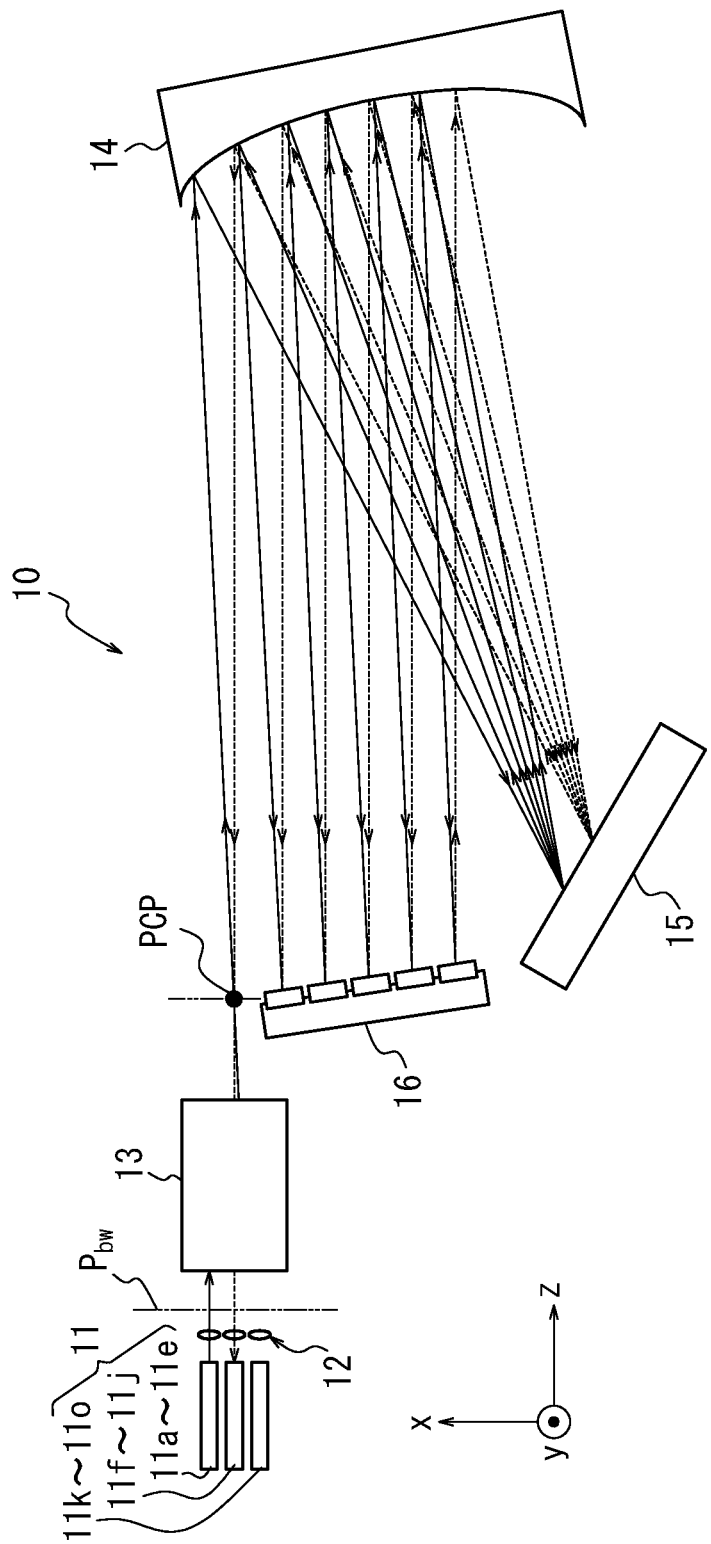
FIG. 1 is a top view illustrating a schematic configuration of a wavelength selective switch according to a first embodiment of the present invention.
Figure 2:
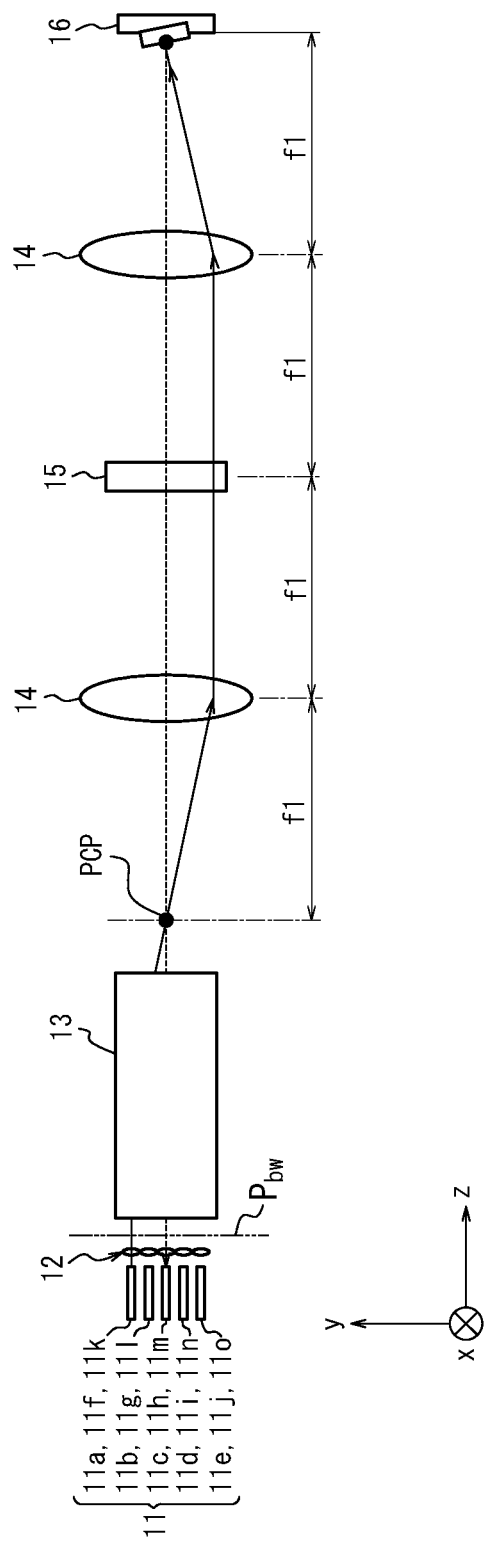
FIG. 2 is a development view of the optical paths of FIG. 1 viewed from the side.

In the following, description is given of embodiments according to a certain aspect of the wavelength selective switch to which the present invention is applied, with reference to the drawings. FIG. 1 is a top view illustrating a schematic configuration of a wavelength selective switch according to a first embodiment of the present invention. FIG. 2 is a development view of the optical paths of FIG. 1 viewed from the side.

A wavelength selective switch 10 is configured by including: an input/output unit 11, a micro lens array 12, an ovalization relay optical system 13, a concave mirror 14, a dispersive portion 15, a deflection portion 16, and so on. The wavelength selective switch 10 has three-dimensional coordinates with x, y, z axes which are perpendicular to one another, and each component are arranged based on the x, y, z axes.

As illustrated in FIG. 3, the input/output unit 11 includes an input port 11a and output ports 11b to 11o which are formed of optical fibers arranged in a matrix along the x-axis direction (second direction) and the y-axis direction (first direction). It should be noted that, even if an actual wavelength selective switch has deflection members such as a mirror and a prism disposed in the optical path thereof so as to bend the optical path, the description on the x-axis direction and the y-axis direction is made assuming a virtual optical system that does not include such deflection members.

Wavelength-multiplexed signal light is input from outside the wavelength selective switch 10 through the input port 11a, and the signal light is output to the outside through the output ports 11b to 11o. Hereinafter, for the sake of convenience in description, the input port 11a, and the output ports 11b to 11o are collectively referred to as input/output ports 11a to 11o (input/output portion) as appropriate.

One end of each of the optical fibers is arranged inside the wavelength selective switch 10, while the other end thereof is connected to the outside of the wavelength selective switch 10. The number of output ports may be larger than the number of input ports. Alternatively, the number of input ports may be larger than the number of output ports. At least two of the input ports and at least two of the output ports may be provided, and the numbers thereof may be different from each other. Although FIGS. 1 to 3 each merely illustrate, for the sake of description, only fifteen input/output ports 11a to 11o arranged in a matrix, the number of the input/output ports is not limited to the number of the input/output ports illustrated in the drawings. It may be designed as appropriate as to which of the input/output ports 11a to 11o to be used as an input port or an output port. It is not necessary to use all the input/output ports 11a to 11o as either one of the input port and the output port, and there may be included an input/output port that does not serve as input port nor output port.

The input/output unit 11 and the micro lens array 12 are arranged so that the input/output ports 11a to 11o each form a pair with each of the micro lenses in the micro lens array 12. The micro lenses each convert light input from the input port 11a into parallel light beams, and make the parallel light beams being output to the output ports 11b to 11o incident on the optical fibers. The light thus converted into parallel light beams by each micro lens, that is, the collimated light forms a beam waist on a plane $P_{bw}$ (hereinafter, referred to as "forming plane") which is perpendicular to the optical axis of the micro lens (see FIGS. 1 and 2). The micro lenses provided to the micro lens array 12 may be spherical or aspherical.

A light beam that has been input into the wavelength selective switch 10 through the input port 11a and a micro lens, and a light beam that is output to any of the micro lenses each corresponding to each of the output ports 11b to 11c are parallel to each other.

The ovalization relay optical system 13 is arranged to have the optical axis coincide with the input/output port 11h at the center among the input/output ports 11a to 11o arranged in five rows and three columns. The ovalization relay optical system 13 condenses incident light beams parallel to the z axis onto a primary condensing point PCP (first conjugate point). Therefore, light incident from any of the input/output ports 11a to 11o is condensed onto the primary condensing point PCP by the ovalization relay optical system 13. Further, the ovalization relay optical system 13 converts light which is in a spot shape and incident from the input/output ports 11a to 11o into an elliptic shape having a long axis in the y-axis direction. A configuration of the ovalization relay optical system 13 which generates the above-mentioned function is described later in detail.

The concave mirror 14 is disposed in a position where a distance from the primary condensing point PCP to the concave mirror 14 becomes equal to the focal length f1 of the concave mirror 14. Further, the concave mirror 14 is disposed so that a plane including the optical axes of the concave mirror 14 and the ovalization relay optical system 13 becomes parallel to the xz plane. With this configuration, the concave mirror 14 deflects light that has passed through the primary condensing point PCP, in a direction perpendicular to the y axis (see FIG. 2).

The dispersive portion 15 is disposed in a position where a distance from the concave mirror 14 to the dispersive portion 15 becomes equal to the focal length f1 of the concave mirror 14. The dispersive portion 15 is, for example, a reflective diffraction grating having a grating parallel to the y axis formed on the dispersion plane. The dispersive element 15 may desirably have high capability to separate light into wavelengths and a large dispersion angle.

Input light reflected by the concave mirror 14 is incident on the dispersive portion 15 as light substantially perpendicular to the y axis, so as to be dispersed at different angles for each wavelength on the dispersion plane of the dispersive portion 15 as illustrated in FIG. 1. In other words, the dispersive portion 15 separates the input light into signal light beams of different wavelengths. The signal light beams are separated in a direction along the xz plane (first plane). The signal light beams dispersed by the dispersive portion 15 are reflected, at the same time, by the dispersive portion 15 toward the concave mirror 14.

The signal light beams are reflected by the concave mirror 14 and the input light is made obliquely incident on the dispersion plane of the dispersive portion 15 to be diffracted thereby. However, for simplicity, FIG. 2 linearly illustrates the optical path from the input/output unit 11 leading to the deflection portion 16.

The deflection portion 16 is disposed in a position where a distance from the concave mirror 14 to the deflection portion 16 becomes equal to the focal length f1 of the concave mirror 14. With this configuration, as illustrated in FIG. 1, the signal light beams dispersed into wavelengths by the dispersive portion 15 are reflected by the concave mirror 14 so that the principal rays of the signal light beams become parallel to one another, which are incident on the deflection portion 16.

As illustrated in FIG. 2, the primary light-condensing point PCP and the deflection portion 16 are conjugate to each other in the x-axis direction (second direction). Accordingly, input light that has passed through the primary condensing point PCP is dispersed by the dispersive portion 15, and then condensed on the deflection portion 16 at the same position as the optical axis of the ovalization relay optical system 13 in the xz plane.

Figure 4:
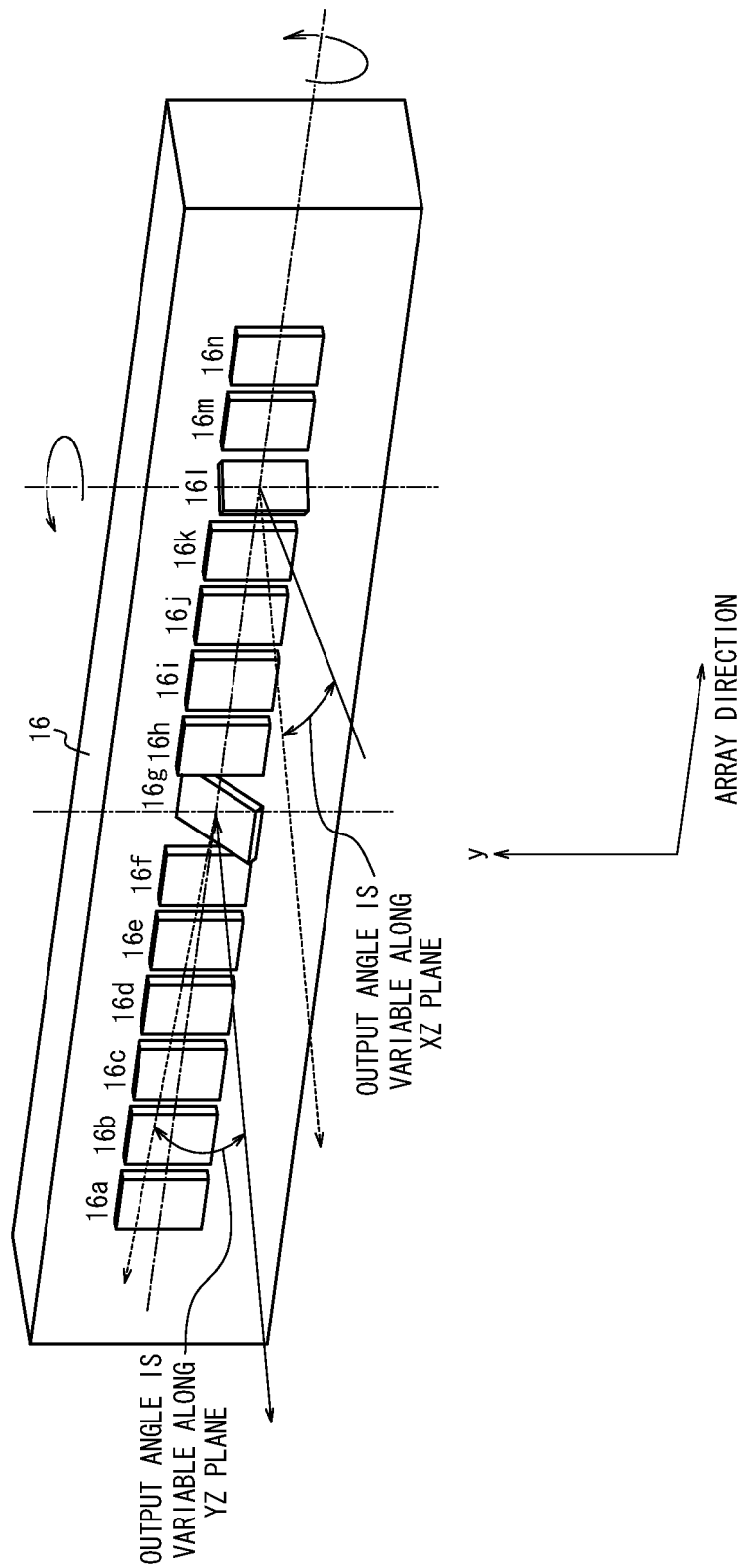
FIG. 4 is a perspective view illustrating a schematic configuration of the deflection portion.

As illustrated in FIG. 4, the deflection portion 16 is provided with a plurality of deflection elements 16a to 16n. The signal light beams dispersed into wavelengths by the dispersive portion 15 are each incident on any of the deflection elements 16a to 16n. The deflection portion 16 is, for example, a MEMS mirror array, and the deflection elements 16a to 16n include micro mirrors forming the MEMS mirror array. The deflection elements 16a to 16n each are a rectangle having the long side in the y-axis direction. The deflection elements 16a to 16n are arranged in series along an array direction parallel to the xz plane (see FIG. 1).

In FIG. 4, the deflection portion 16 includes fourteen deflection elements 16a to 16n. However, the number of deflection elements is not limited to fourteen. Further, the deflection elements 16a to 16n may be the same or may be different from each other in terms of disposition interval, shape, and area of the mirror surfaces thereof The deflection elements 16a to 16n may be controlled independently of one another to be changed in tilt. The deflection elements 16a to 16n each may be tiled so as to be turnable around a straight light parallel to the y axis and around a straight light parallel to the array direction. The deflection elements 16a to 16n each may be turned around the straight line parallel to the y axis, so as to be changed in position along the x-axis direction of the output ports 11b to 11o transmitting signal light. On the other hand, the deflection elements 16a to 16n each may be turned around the straight line parallel to the array direction, so as to be changed in position along the y-axis direction of the output ports 11b to 11o transmitting signal light.

The signal light beams in wavelengths reflected by the respective deflection elements 16a to 16n each pass through the concave mirror 14 to be diffracted by the dispersive portion 15, and travel along an optical path in a direction opposite to the input light, so as to be output to any of the output ports 11b to 11o of the input/output unit 11. It may be designed as appropriate as to which of the input/output ports 11a to 11o to be used as an input port or an output port.

Here, when outputting, from the input/output port 11h, a signal light beam of at least one of the wavelengths of the signal light beams incident on the plurality of the deflection elements 16a to 16n, the deflection direction of the corresponding one of the deflection elements 16a to 16n is controlled so as to reflect light of a specific wavelength in a predetermined direction as illustrated by the broken lines of FIGS. 1 and 2. The light of a specific wavelength reflected by one of the deflection elements 16a to 16n passes through the concave mirror 14, the dispersive portion 15, the ovalization relay optical system 13, and the micro lens array 12, so as to be output from the input/output port 11h. When outputting a plurality of light beams of different wavelengths from the same output/input port 11h, the plurality of light beams of different wavelengths are multiplexed by the dispersive portion 15.

Figure 5:
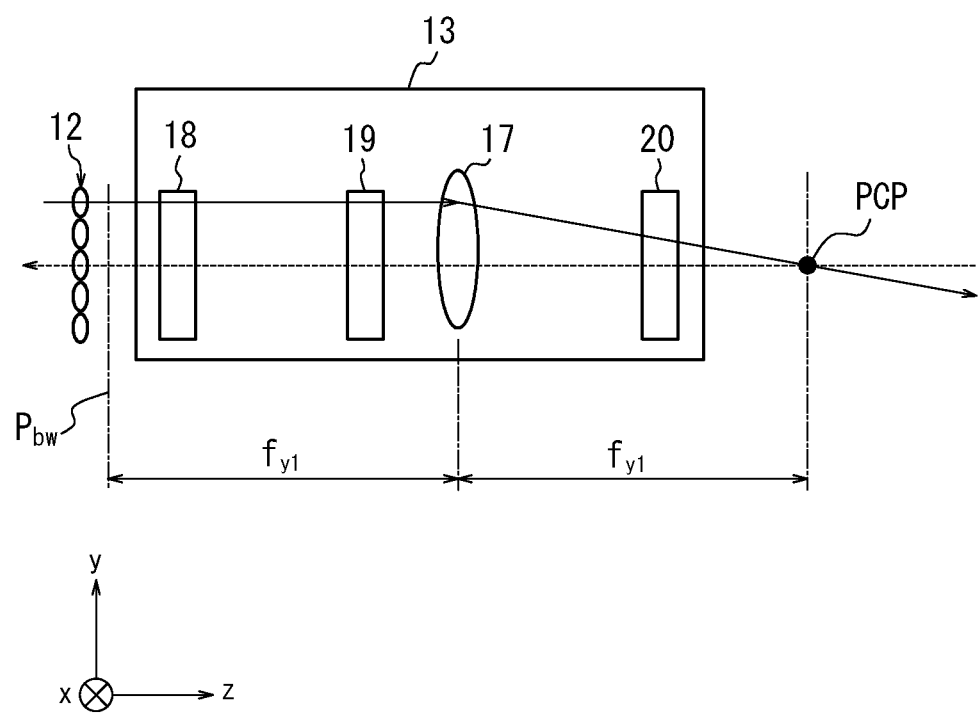
FIG. 5 is a side view illustrating the ovalization relay optical system according to the first embodiment.
Figure 6:
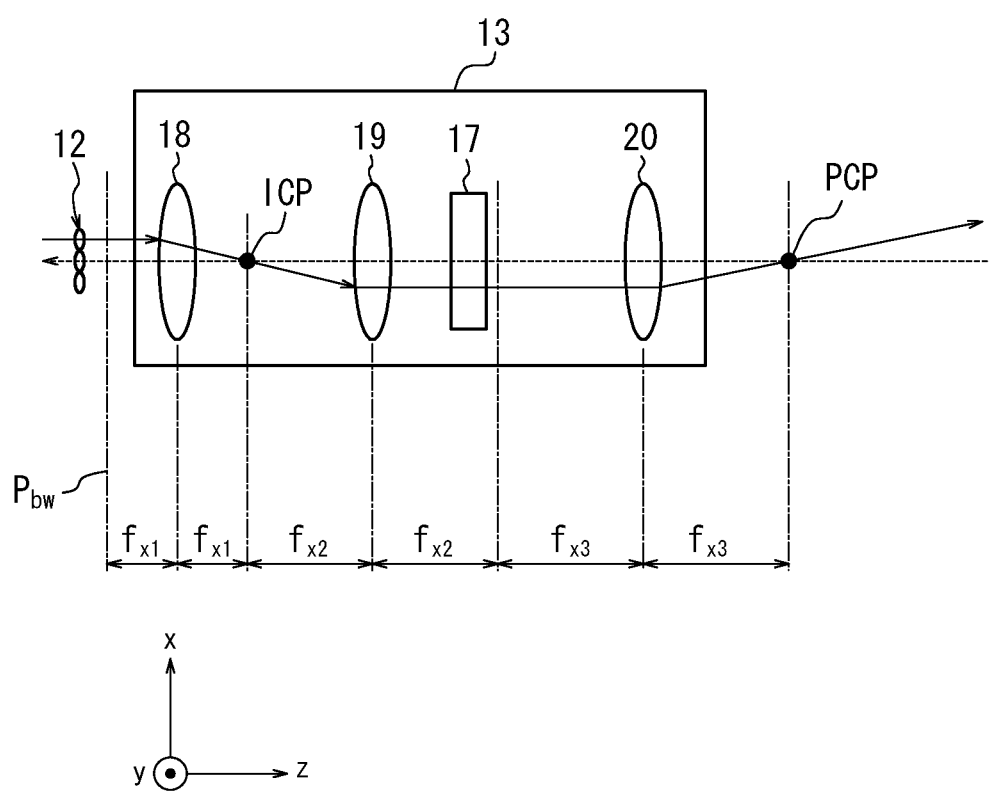
FIG. 6 is a top view illustrating the ovalization relay optical system according to the first embodiment.

Next, description is given of a configuration of the ovalization relay optical system 13. As illustrated in FIGS. 5 and 6, the ovalization relay optical system 13 is configured by including a first cylindrical lens 17, a second cylindrical lens 18, a third cylindrical lens 19, and a fourth cylindrical lens 20.

The second cylindrical lens 18, the third cylindrical lens 19, the first cylindrical lens 17, and the fourth cylindrical lens 20 are arranged in order from the input/output unit 11 side to the primary condensing point PCP. The second to fourth cylindrical lenses 18 to 20 are disposed to have the same opticalaxial plane in common and to have the primary condensing point PCP formed in the opticalaxial plane. Further, the first cylindrical lens 17 is disposed to have the primary condensing point PCP formed in the opticalaxial plane thereof. The above-mentioned optical axis of the ovalization relay optical system 13 is defined by a straight line where the opticalaxial plane of the second to fourth cylindrical lenses 18 to 20 and the opticalaxial plane of the first cylindrical lens 17 intersect each other.

As illustrated in FIG. 5, the first cylindrical lens 17 (first ovalization optical element) converges light beams only in the y-axis direction. That is, the cylindrical lens 17 has a refractive power only in the y-axis direction. The first cylindrical lens 17 is disposed in a position where a distance from the forming plane $P_{bw}$ having a beam waist formed thereon to the first cylindrical lens 17 and a distance from the first cylindrical lens 17 to the primary condensing point PCP are both equal to the focal length $f_{y1}$ of the first cylindrical lens 17 in the yz plane (see FIG. 5).

Therefore, in the yz plane, signal light input from any of the input/output ports 11a to 11o travels parallel to the z axis to the first cylindrical lens 17, and is condensed onto the primary condensing point PCP by the first cylindrical lens 17t. Further, a beam waist in the yz plane is formed at the primary condensing point PCP.

As illustrated in FIG. 6, the second to fourth cylindrical lenses 18 to 20 converge light beams in the x-axis direction. In other words, the cylindrical lenses each have a refractive power only in the x-axis direction. The second to fourth cylindrical lenses 18 to 20 each have focal lengths of $f_{x1}$, $f_{x2}$, and $f_{x3}$, respectively, in the xz plane. The second to fourth cylindrical lenses 18 to 20 are designed so that the total of the focal lengths of the second to fourth cylindrical lenses 18 to 20 in the xz plane substantially coincides with a focal length $f_{y1}$ of the first cylindrical lens 17 in the yz plane. That is, the following Expression (1) is satisfied.

$$f_{y1} = f_{x1} + f_{x2} + f_{x3} \quad (1)$$

The second cylindrical lens 18 is disposed in a position where a distance from the forming plane $P_{bw}$ having a beam waist formed thereon to the second cylindrical lens 18 becomes equal to the focal length $f_{x1}$ of the second cylindrical lens 18 in the xz plane. Therefore, in the xz plane, signal light input from any of the input/output ports 11a to 11o travels parallel to the z axis to the second cylindrical lens 18, and is condensed onto the intermediate condensing point ICP (first condensing point) by the second cylindrical lens 18. The intermediate condensing point ICP is away from the second cylindrical lens 18 by the focal length $f_{x1}$ of the second cylindrical lens 18 in the xz plane.

The third cylindrical lens 19 is disposed in a position where a distance from the intermediate condensing point ICP to the third cylindrical lens 19 in the xz plane becomes equal to the focal length $f_{x2}$ of third cylindrical lens 19 in the xz plane. Further, the fourth cylindrical lens 20 is disposed in a position where a distance from the third cylindrical lens 19 to the fourth cylindrical lens 20 becomes equal to the total of the focal lengths ($f_{x2}+f_{x3}$) of the third cylindrical lens 19 and the fourth cylindrical lens 20 in the xz plane.

As described above, the total of the focal lengths of the second to fourth cylindrical lenses 18 to 20 ($f_{x1}+f_{x2}+f_{x3}$) in the xz plane substantially coincides with the focal length $f_{y1}$ of the first cylindrical lens 17 in the yz plane, and hence, the distance from the fourth cylindrical lens 20 to the primary condensing point PCP is equal to the focal length $f_{x3}$ of the fourth cylindrical lens 20 in the xz plane. Therefore, the intermediate condensing point ICP and the primary condensing point PCP in the xz plane are conjugate to each other in the x-axis direction (second direction).

With the second to fourth cylindrical lenses 18 to 20 arranged as described above, signal light input from any of the input/output ports 11a to 11o is condensed onto the primary condensing point PCP in the xz plane. Further, a beam waist in the xz plane is formed on the primary condensing point PCP.

The wavelength selective switch 10 according to the first embodiment configured as described above is capable of simultaneously increasing output efficiency while reducing the thickness of the wavelength selective switch 10 at the same time, even with the input/output ports 11a to 11o being two-dimensionally arranged. The effect thus produced is described below in detail.

Figure 7:
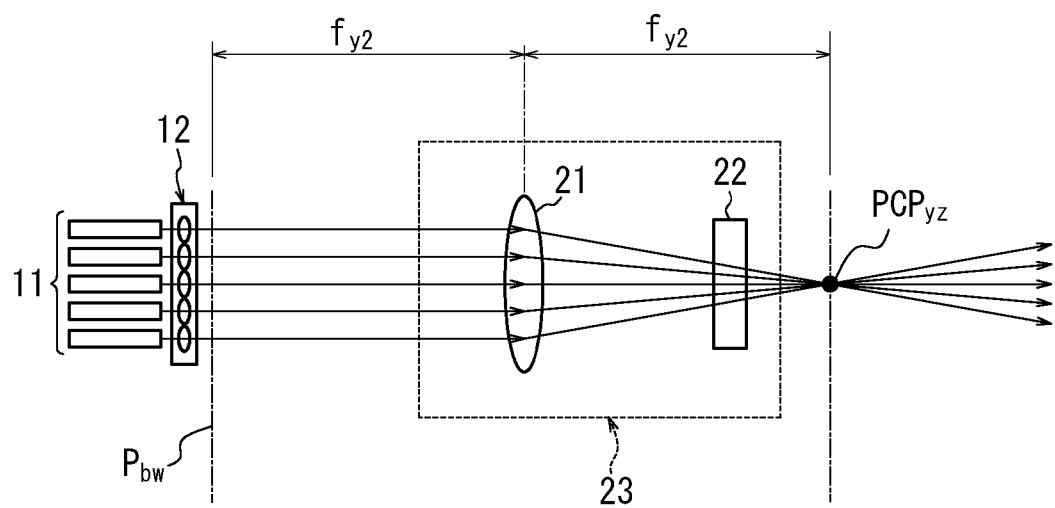
FIG. 7 is a side view illustrating a schematic configuration of an ovalization optical system in a conventional wavelength selective switch.

The wavelength selective switch according to the invention disclosed in Japanese Patent Publication 2009-009073 employs, in place of the ovalization relay optical system 13 in the first embodiment, an ovalization optical system 23 including a spherical lens 21 and a cylindrical lens 22 of FIG. 7. In the ovalization optical system 23, the spherical lens 21 is disposed in a position where a distance from the forming plane $P_{bw}$ to the spherical lens 21 and a distance from the spherical lens 21 to the primary condensing point $PCP_{yz}$ (hereinafter, referred to as "yz condensing point") in the yz plane both coincide with the focal length $f_{y2}$ of the spherical lens 21.

Figure 8:
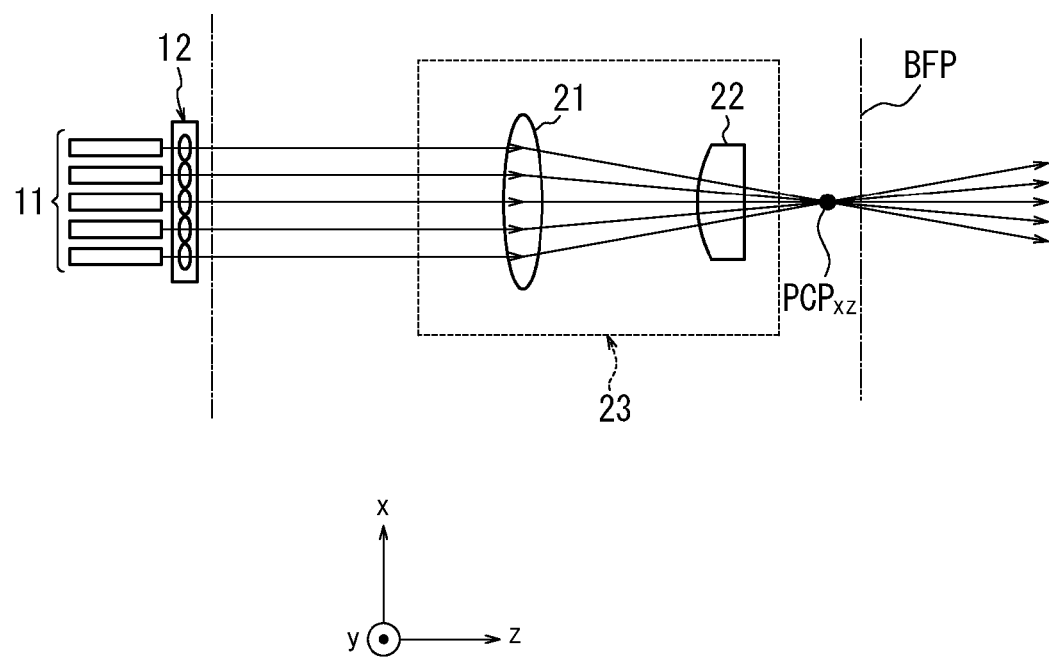
FIG. 8 is a top view illustrating the schematic configuration of the ovalization optical system in the conventional wavelength selective switch.

The following problem is caused when the wavelength selective switch including the ovalization optical system 23 has input/output ports two-dimensionally arranged. The cylindrical lens 22 does not have a refractive power in the y-axis direction, and therefore the yz condensing point $PCP_{yz}$ coincides with a back focal position of the spherical lens 21. On the other hand, as illustrated in FIG. 8, the cylindrical lens 22 has a refractive power in the x-axis direction, and therefore the primary condensing point $PCP_{xz}$ (hereinafter, referred to as "xz condensing point") in the xz plane comes closer to the cylindrical lens 22 side as compared to the back focal position BFP of the spherical lens 21.

As described above, the xz condensing point $PCP_{xz}$ and the yz condensing point $PCP_{yz}$ do not coincide with each other, with the result that light input from any of the input/output ports cannot be condensed at the same position both in the xz plane and the yz plane. Therefore, light input from an arbitrary input/output port cannot be output from another input/output port.

Figure 9A:
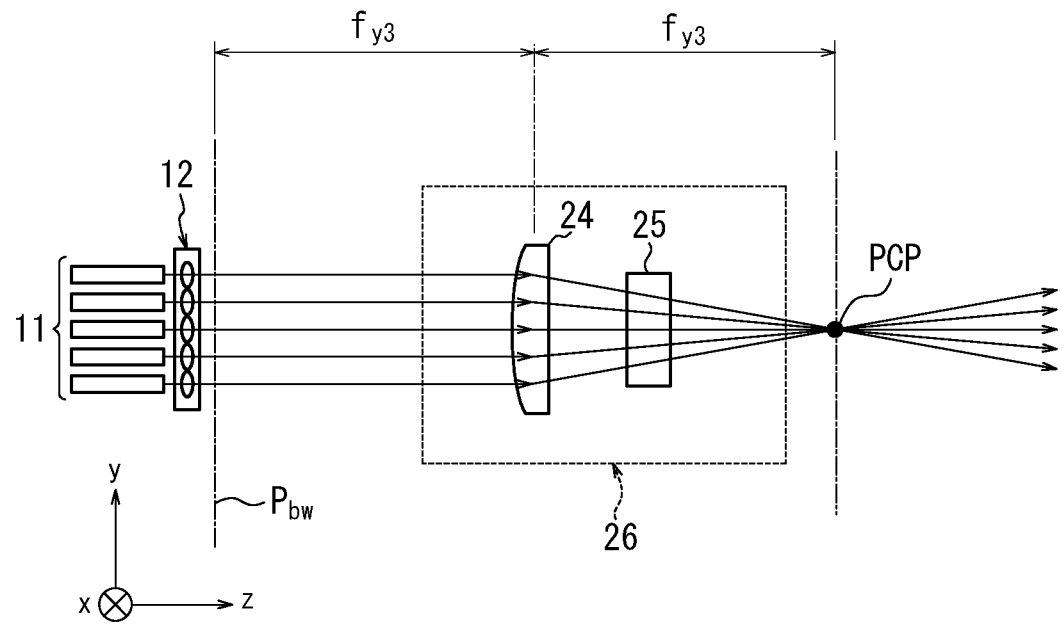
FIG. 9A is a side view illustrating the schematic configuration of the ovalization optical system in the conventional wavelength selective switch, the ovalization optical system being subjected to a first improvement.
Figure 9B:
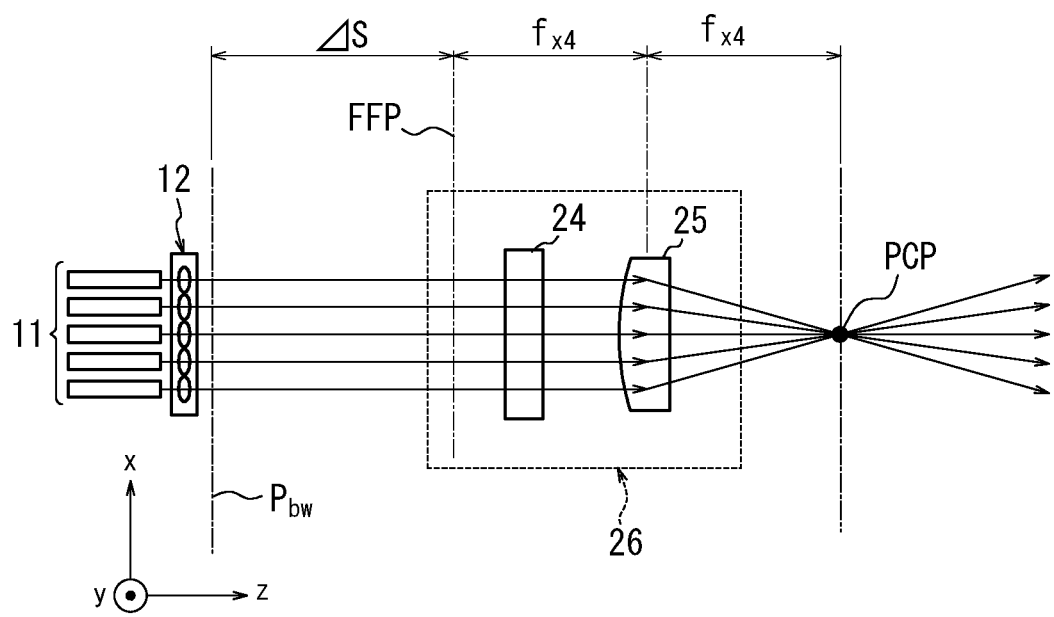
FIG. 9B is a top view illustrating the schematic configuration of the ovalization optical system in the conventional wavelength selective switch, the ovalization optical system being subjected to the first improvement.

To solve the problem, as illustrated in FIGS. 9A and 9B, it may be conceivable to employ, in place of the ovalization optical system 23, an ovalization optical system 26 which includes a fifth cylindrical lens 24 having a refractive power only in the y-axis direction and a sixth cylindrical lens 25 having a refractive power only in the x direction.

In the ovalization optical system 26, the fifth cylindrical lens is designed and disposed in a position where distances from the fifth cylindrical lens 24 to the forming plane $P_{bw}$ and to the primary condensing point PCP each coincide with the focal length $f_{y3}$ of the fifth cylindrical lens 24 in the yz plane. Further, the sixth cylindrical lens 25 is disposed in a position where a distance from the sixth cylindrical lens 25 to the primary condensing point PCP coincides with the focal length $f_{x4}$ of the sixth cylindrical lens 25 in the xz plane.

With the above-mentioned configuration, the condensing points of signal light in the xz plane and in the yz plane both coincide with the primary condensing point PCP, which makes it possible to allow light input from any of the input/output ports to be condensed at the same position both in the xz plane and in the yz plane.

However, the above-mentioned configuration suffers a displacement of ΔS between a front focal position FFP of the sixth cylindrical lens 25 and the forming plane $P_{bw}$ in the xz plane. Therefore, signal light at the primary condensing point PCP has a beam diameter in the x-axis direction which is larger than the beam waist diameter in the x-axis direction formed in the vicinity of the primary condensing point PCP. Therefore, it is difficult to output signal light input to the input/output port, from another input/output port with high efficiency.

However, even when the beam waist forming position is displaced from the primary condensing point PCP, signal light can still be output with high efficiency as long as the beam diameter and the beam waist diameter bear a small difference at the primary condensing point PCP. It may be conceivable to increase the beam waist diameter in order to reduce the difference between the beam diameter and the beam waist diameter at the primary condensing point PCP.

Figure 10A:
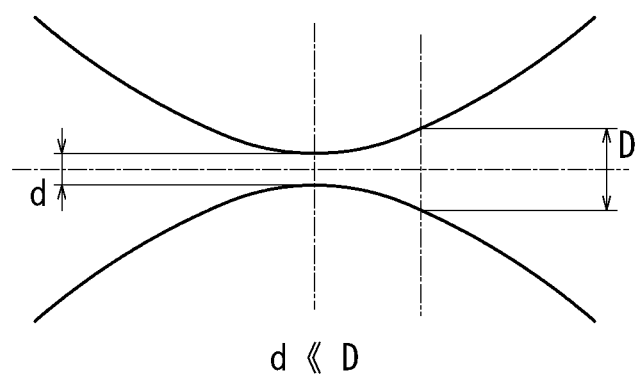
FIG. 10A is a view for illustrating how the beam diameter changes depending on the beam waist diameter.
Figure 10B:
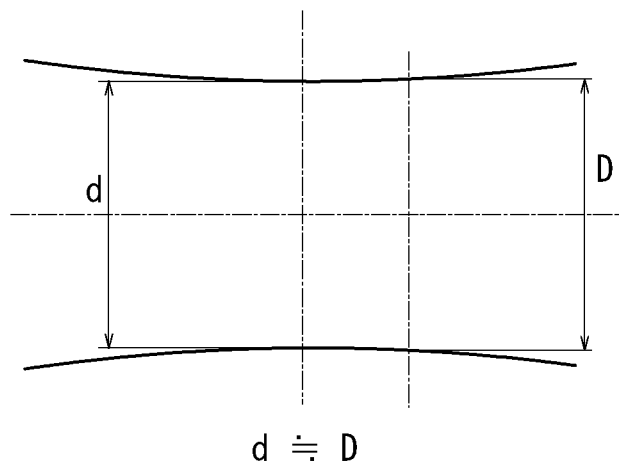
FIG. 10B is another view for illustrating how the beam diameter changes depending on the beam waist diameter.

As illustrated in FIGS. 10A and 10B, the ratio of the beam diameter D at a distance from the beam waist forming position to the beam waist diameter d, which is obtained as D/d, becomes smaller as the beam waist diameter d increases. For this reason, the beam waist diameter formed in the vicinity of the condensing point may be increased, to thereby reduce the difference between the beam diameter and the beam waist diameter at the condensing point. Therefore, a beam waist having a large diameter in a corresponding direction may be formed by either one of the fifth and sixth cylindrical lenses 24, 25, to thereby increase the output efficiency of signal light.

In the meantime, in order to broaden the transmission band of signal light in the wavelength selective switch, it is preferred to have a beam diameter small in the x-axis direction corresponding to the array direction of the deflection elements 16a to 16n. Further, in order to reduce the thickness of the wavelength selective switch, it is preferred to increase the beam diameter in the y-axis direction.

Figure 11A:
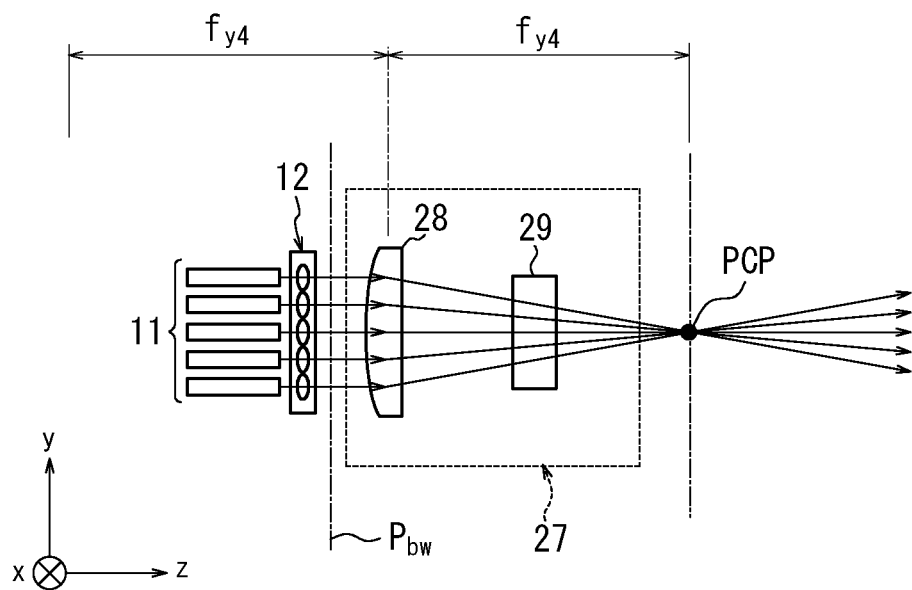
FIG. 11A is a side view illustrating the schematic configuration of the ovalization optical system in the conventional wavelength selective switch, the ovalization optical system being subjected to a second improvement.
Figure 11B:
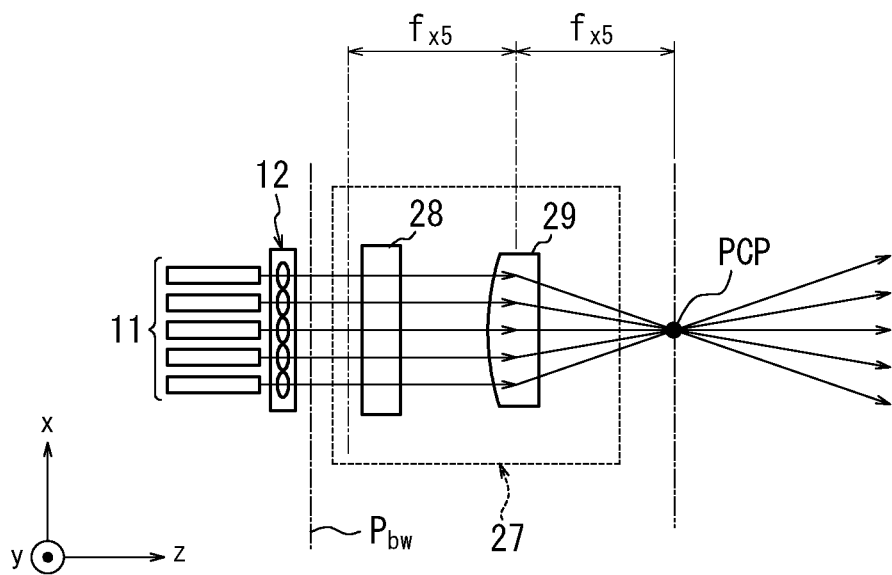
FIG. 11B is a top view illustrating the schematic configuration of the ovalization optical system in the conventional wavelength selective switch, the ovalization optical system being subjected to the second improvement.

For this reason, it may be conceivable to increase the beam diameter in the y-axis direction while suppressing the beam diameter in the x-axis direction to small. In order to produce such an effect, it may be conceivable to employ the ovalization optical system 27 of FIG. 11 in place of the ovalization optical system 26 of FIG. 9.

In the ovalization optical system 27, a seventh cylindrical lens 28 is disposed in a position where a distance from the seventh cylindrical lens 28 to the primary condensing point PCP coincides with the focal length $f_{y4}$ of the seventh cylindrical lens 28 in the yz plane. Meanwhile, an eighth cylindrical lens 29 is designed and disposed in a position where distances from the eighth cylindrical lens 29 to the forming plane $P_{bw}$ and to the primary condensing point PCP each coincide with the focal length $f_{x5}$ of the eighth cylindrical lens 29 in the xz plane.

With this configuration, the ratio of the beam diameter D at the yz condensing point to the beam waist diameter d in the yz plane, i.e., the ratio D/d, is smaller than 1.2, the output efficiency of signal light may be increased. However, if such a condition is satisfied, it is difficult to increase the aspect ratio of a beam formed on the primary condensing point PCP. It is difficult to reduce the thickness of the wavelength selective switch when the aspect ratio is small.

In general, the focal length of the seventh cylindrical lens 28 in the yz plane may be changed relative to the eighth cylindrical lens 29 having an arbitrary focal length, so that D/d in the yz plane and the aspect ratio at the primary condensing point PCP vary.

Figure 12:
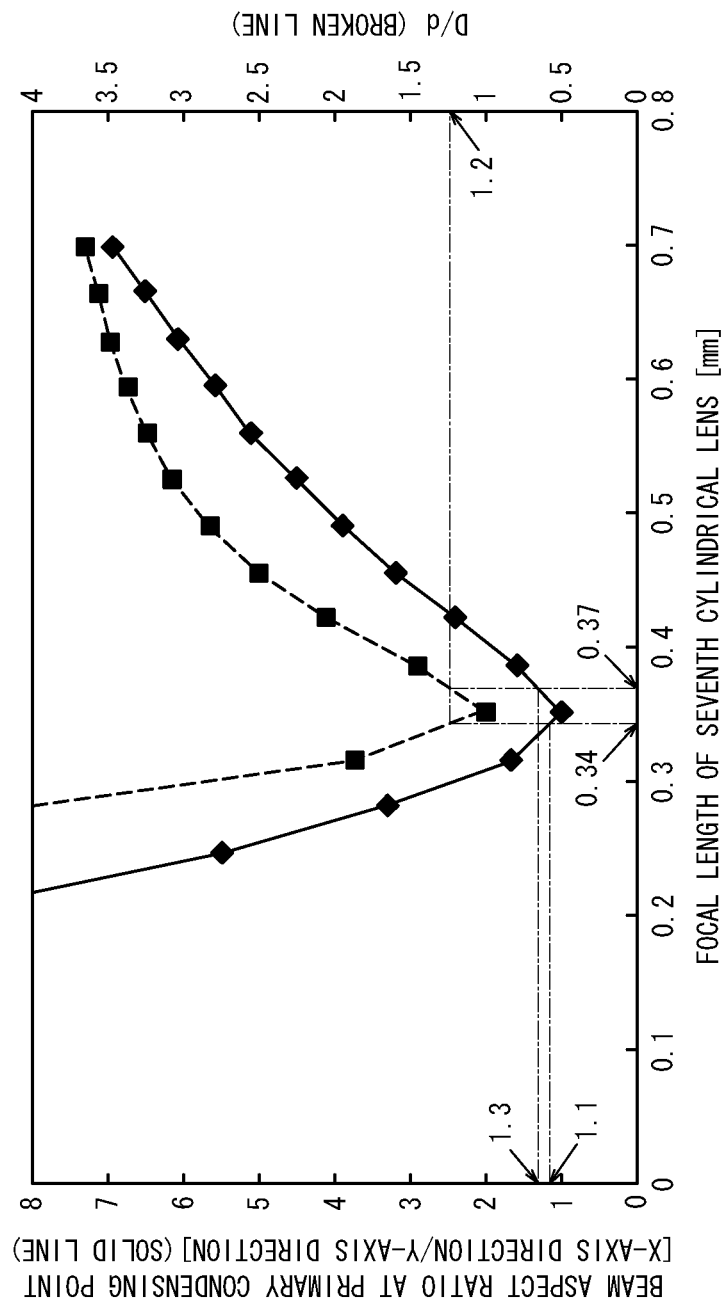
FIG. 12 is a first graph for illustrating a beam aspect ratio that can be obtained with respect to D/d acceptable in the ovalization optical system that has been subjected to the second improvement.

For example, as shown in FIG. 12, when the eighth cylindrical lens 29 having a focal length of 0.35 mm is used, the ratio D/d may be kept below 1.2 with a focal length of the seventh cylindrical lens 28 in the yz plane falling within a range of 0.34 to 0.37 mm. The beam aspect ratio to be obtained within this focal range is about 1.1 to 1.3.

Figure 13:
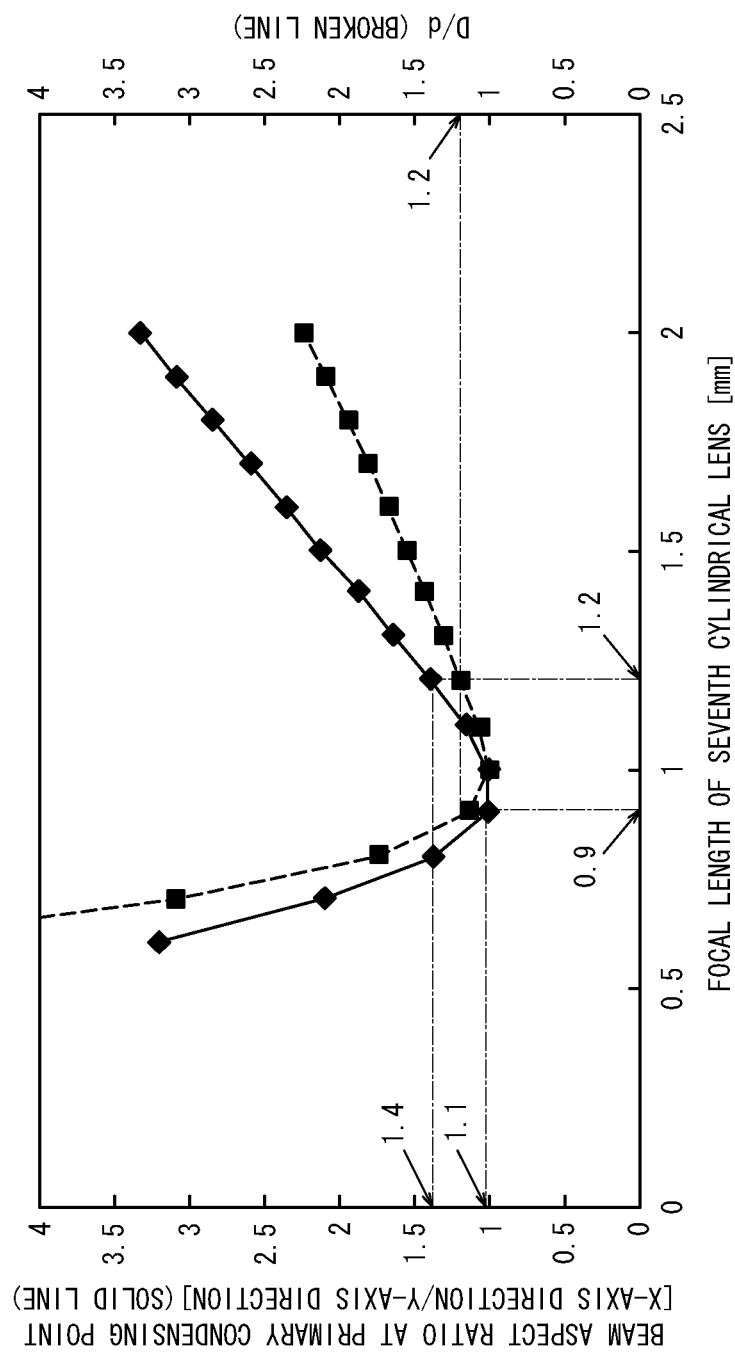
FIG. 13 is a second graph for illustrating a beam aspect ratio that can be obtained with respect to D/d acceptable in the ovalization optical system that has been subjected to the second improvement.

Further, as shown in FIG. 13, when the eighth cylindrical lens 29 having a focal length of 1.0 mm is used, the ratio D/d may be kept below 1.2 with a focal length of the seventh cylindrical lens 28 in the yz plane falling within a range of 0.9 to 1.2 mm. The beam aspect ratio to be obtained within this focal range is about 1.1 to 1.4.

Figure 14:
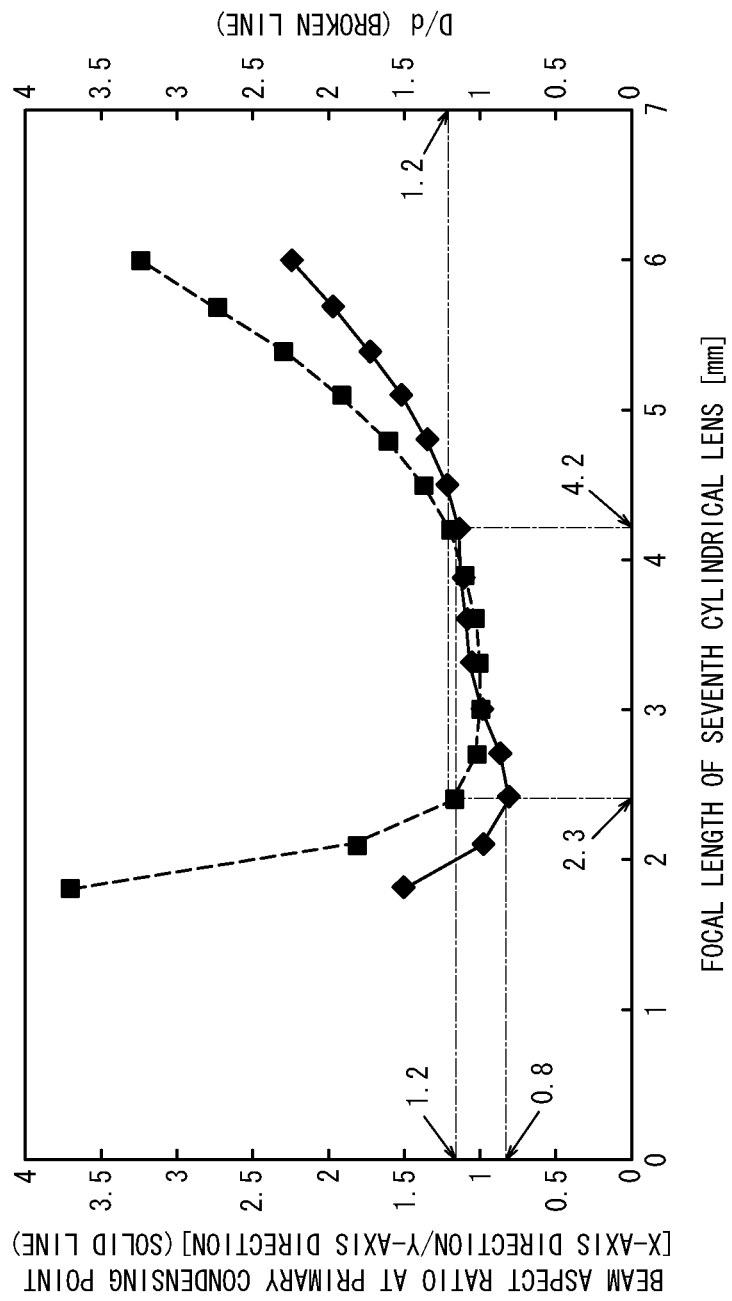
FIG. 14 is a third graph for illustrating a beam aspect ratio that can be obtained with respect to D/d acceptable in the ovalization optical system that has been subjected to the second improvement.

Further, for example, as shown in FIG. 14, when the eighth cylindrical lens 29 having a focal length of 3.0 mm is used, the ratio D/d may be kept below 1.2 with a focal length of the seventh cylindrical lens 28 in the yz plane falling within a range of 2.3 to 4.2 mm. The beam aspect ratio to be obtained within this focal range is about 0.8 to 1.2.

As described above, when the ratio D/d is suppressed below 1.2, there cannot be attained an aspect ratio of about 10, which may otherwise be obtained when the input/output ports that are arranged one-dimensionally. As a result, it has been difficult to reduce the thickness of the wavelength selective switch.

On the other hand, according to this embodiment, signal light is condensed onto the intermediate condensing point ICP in the xz plane, and the intermediate condensing point ICP and the primary condensing point PCP are made conjugate to each other in the x-axis direction (second direction), to thereby condense signal light in the xz plane onto the primary condensing point PCP. With this configuration, there may be employed a plurality of cylindrical lenses each having a refractive power in the x-axis direction. When a plurality of cylindrical lenses are allowed to be used, at least one of the cylindrical lenses may have a focal length arbitrarily set. Therefore, as described below, the aspect ratio of signal light at the primary condensing point PCP may be arbitrarily set. Specifically, the aspect ratio may be set to 2 or larger.

The signal light has a radius $\omega_{y1}$ along the y axis at the primary condensing point PCP, which is calculated by Expression (2) where $\omega_1$ represents a beam-waist radius formed by the micro lens array 12 and $\lambda$ represents the wavelength of the signal light.

$$\omega_{y1} = \frac{\lambda \times f_{y1}}{\pi \times \omega_1} \quad (2)$$

The signal light has a radius $\omega_{x1}$ along the x axis at the intermediate condensing point ICP, which is calculated by Expression (3).

$$\omega_{x1} = \frac{\lambda \times f_{x1}}{\pi \times \omega_1} \quad (3)$$

Further, the signal light has a radius $\omega_{x2}$ along the x axis at the primary condensing point PCP, which is calculated by Expression (4), using the signal light radius $\omega_{x1}$ at the intermediate condensing point ICP calculated by Expression (3).

$$\omega_{x2} = \omega_{x1} \times \frac{f_{x3}}{f_{x2}} = \frac{\lambda}{\pi \times \omega_1} \times \frac{f_{x1} \times f_{x3}}{f_{x2}} \quad (4)$$

Based on Expressions (1) and (3), the aspect ratio H of the signal light at the primary condensing point PCP is calculated by Expression (5).

$$H = \frac{\omega_{y1}}{\omega_{x2}} = \frac{f_{y1} \times f_{x2}}{f_{x1} \times f_{x3}} \quad (5)$$

Expression (5) is modified by using Expression (1), to thereby obtain Expression (6).

$$H = \frac{f_{y1} \times f_{x2}}{f_{x1} \times f_{x3}} = \frac{(f_{x1} + f_{x2} + f_{x3}) \times f_{x2}}{f_{x1} \times f_{x3}} \quad (6)$$

Expression (6) shows that the aspect ratio of the signal light at the primary condensing point PCP can be matched to a desired value, making it possible to reduce the thickness of the wavelength selective switch 10.

Further, the beam waist is formed at the primary condensing point PCP both in the xz plane and in the yz plane, so that the signal light can be output with high efficiency.

Next, a wavelength selective switch according to a second embodiment is described. The second embodiment is different from the first embodiment in terms of configuration of the first cylindrical lens. In the following, the second embodiment is described, mainly about the differences from the first embodiment. The portions similar in function and configuration to those of the first embodiment are denoted by the same reference symbols, and the description thereof is omitted.

The second embodiment is similar to the first embodiment in configuration and function of the respective portions of the wavelength selective switch, except for the first cylindrical lens.

Figure 15:
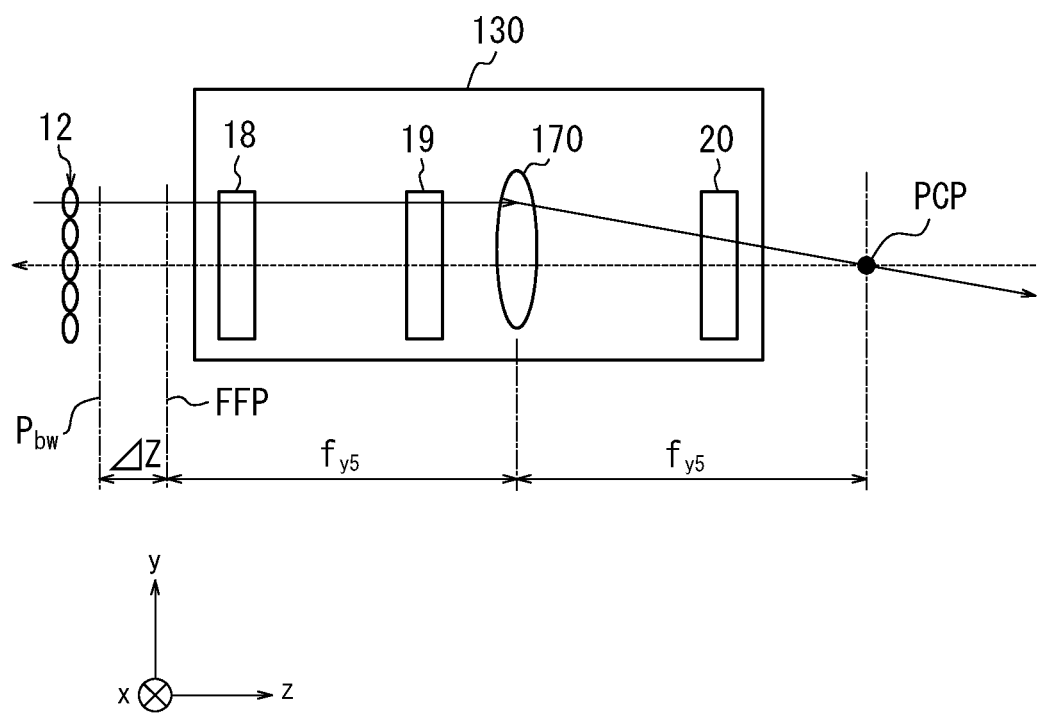
FIG. 15 is a side view illustrating a schematic configuration of an ovalization relay optical system according to a second embodiment of the present invention.

As illustrated in FIG. 15, as in the first embodiment, an ovalization relay optical system 130 is configured by including a first cylindrical lens 170 and the second to fourth cylindrical lenses 18 to 20.

The first cylindrical lens 170 converges light beams only in the y-axis direction. As in the first embodiment, the first cylindrical lens 170 is disposed in a position where a distance from the first cylindrical lens 170 to the primary condensing point PCP becomes equal to the focal length $f_{y5}$ of the first cylindrical lens 170 in the yz plane. Unlike the first embodiment, the forming plane $P_{bw}$ and the front focal position FFP of the first cylindrical lens 170 are spaced apart from each other at a distance of $\Delta Z$. The first cylindrical lens 170 is designed so that $\Delta Z$ satisfies Expression (7).

$$\Delta Z < 0.45 \times \frac{\lambda \times f_{y5}^2}{\pi \omega_{y1}^2} \quad (7)$$

Similarly to the first embodiment, the wavelength selective switch according to the second embodiment configured as described above is also capable of reducing the thickness of the wavelength selective switch 10 while increasing the output efficiency of signal light at the same time, even with the input/output ports being two-dimensionally arranged. The effect thus produced is described below in detail.

Assuming that a distance from the primary condensing point PCP to a beam waist forming position in the yz plane is Z, the ratio D/d in the yz plane is calculated by Expression (8).

$$\frac{D}{d} = \frac{\omega_{y1} \times \sqrt{1 + \left(\frac{\lambda \times Z}{\pi \times \omega_{y1}^2}\right)^2}}{\omega_{y1}} = \sqrt{1 + \left(\frac{\lambda \times Z}{\pi \times \omega_{y1}^2}\right)^2} \quad (8)$$

As described above, when the ratio D/d in the yz plane is less than 1.2, the output efficiency of signal light may be increased. Therefore, in order to obtain the ratio D/d that is smaller than 1.2, the distance Z between the primary condensing point PCP and the beam waist forming position needs to satisfy Expression (9).

$$Z < 0.633 \times \frac{\pi \times \omega_{y1}^2}{\lambda} \quad (9)$$

Using the distance Z between the primary condensing point PCP and the beam waist forming position by the first cylindrical lens 170, $\Delta Z$ is calculated by Expression (10).

$$\Delta Z = \frac{(\pi \times \omega_{y1}^2)^2 \times \frac{1}{f_{y5}} - (Z + f_{y5}) \times \left(1 - \frac{Z + f_{y5}}{f_{y5}}\right)}{\left(\frac{\pi \times \omega_{y1}^2}{\lambda}\right)^2 \times \left(\frac{1}{f_{y5}}\right)^2 + \left(1 - \frac{Z + f_{y5}}{f_{y5}}\right)^2} - f_{y5} \quad (10)$$

The right side of Expression (10) is arranged so as to obtain Expression (11).

$$\Delta Z = \frac{Z}{\left(\frac{\pi \times \omega_{y1}^2}{\lambda}\right)^2 \times \left(\frac{1}{f_{y5}}\right)^2 + \left(\frac{Z}{f_{y5}}\right)^2} \quad (11)$$

Expression (7) is obtained based on Expressions (9) and (11).

Therefore, when Expression (7) is satisfied, the ratio of the beam diameter D in the y-axis direction at the primary condensing point PCP to the beam waist diameter d in the yz plane, i.e., the ratio D/d, becomes smaller than 1.2. For this reason, the wavelength selective switch according to the second embodiment is also capable of increasing output efficiency of signal light.

Further, according to the second embodiment, unlike the first embodiment, it is only necessary to satisfy Expression (11), without the need to satisfy Expression (1). Here, Expression (11) has fewer restrictions as compared to Expression (1), which offers more freedom in designing the aspect ratio of signal light at the primary condensing point PCP. Therefore, the wavelength selective switch 10 can be reduced in thickness.

Next, a wavelength selective switch according to a third embodiment of the present invention is described. The third embodiment is different from the first embodiment in that concave cylindrical mirrors are employed in place of the first, third, and fourth cylindrical lenses, and in that a limitation is placed on the focal length of the second cylindrical lens in the xz plane. In the following, the third embodiment is described, mainly about the differences from the first embodiment. The portions similar in function and configuration to those of the first embodiment are denoted by the same reference symbols, and the description thereof is omitted.

The third embodiment is similar to the first embodiment in configuration and function of the respective portions of the wavelength selective switch, except for the first, third, and fourth cylindrical lenses.

Figure 16:
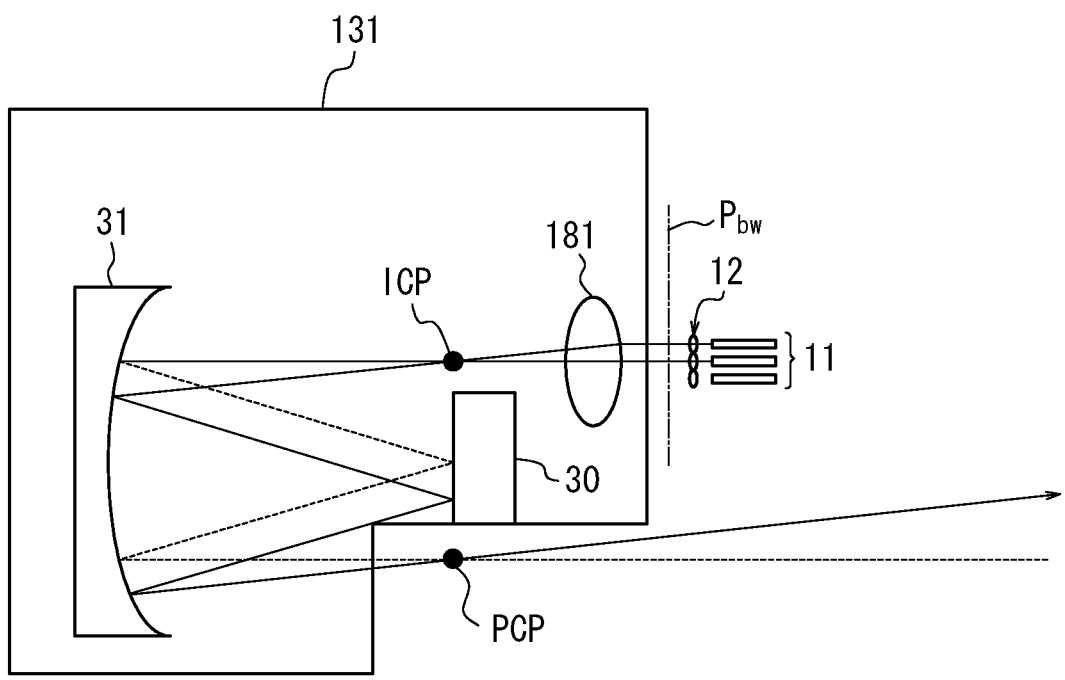
FIG. 16 is a top view illustrating a schematic configuration of an ovalization relay optical system according to a third embodiment of the present invention.
Figure 17:
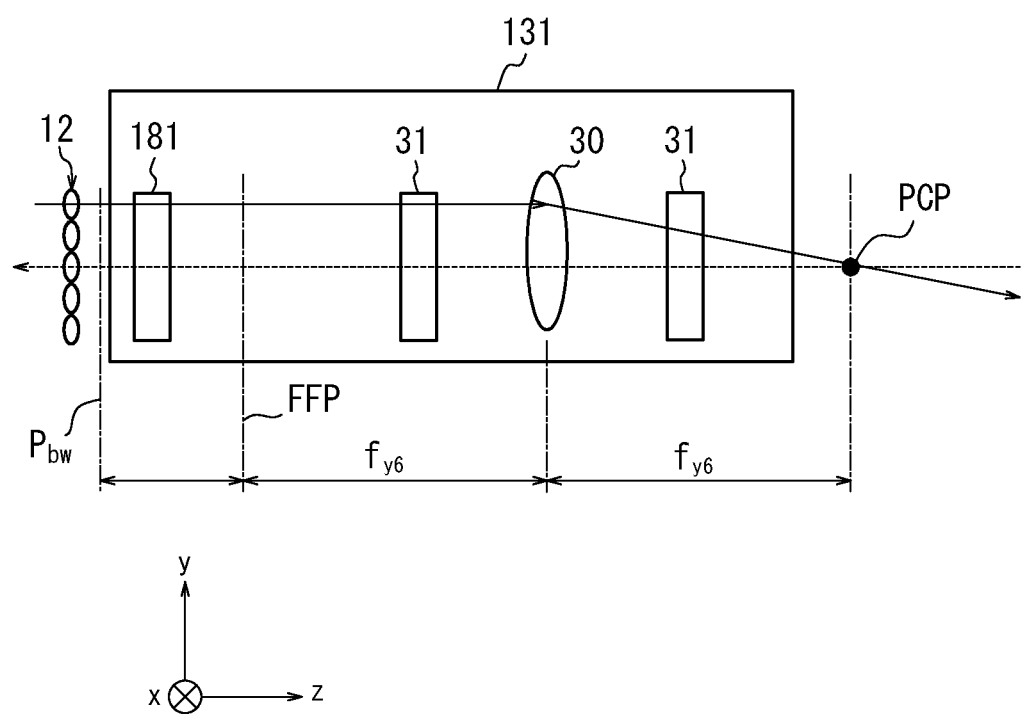
FIG. 17 is a development view of the optical paths in the ovalization relay optical system according to the third embodiment viewed from the side.
Figure 18:
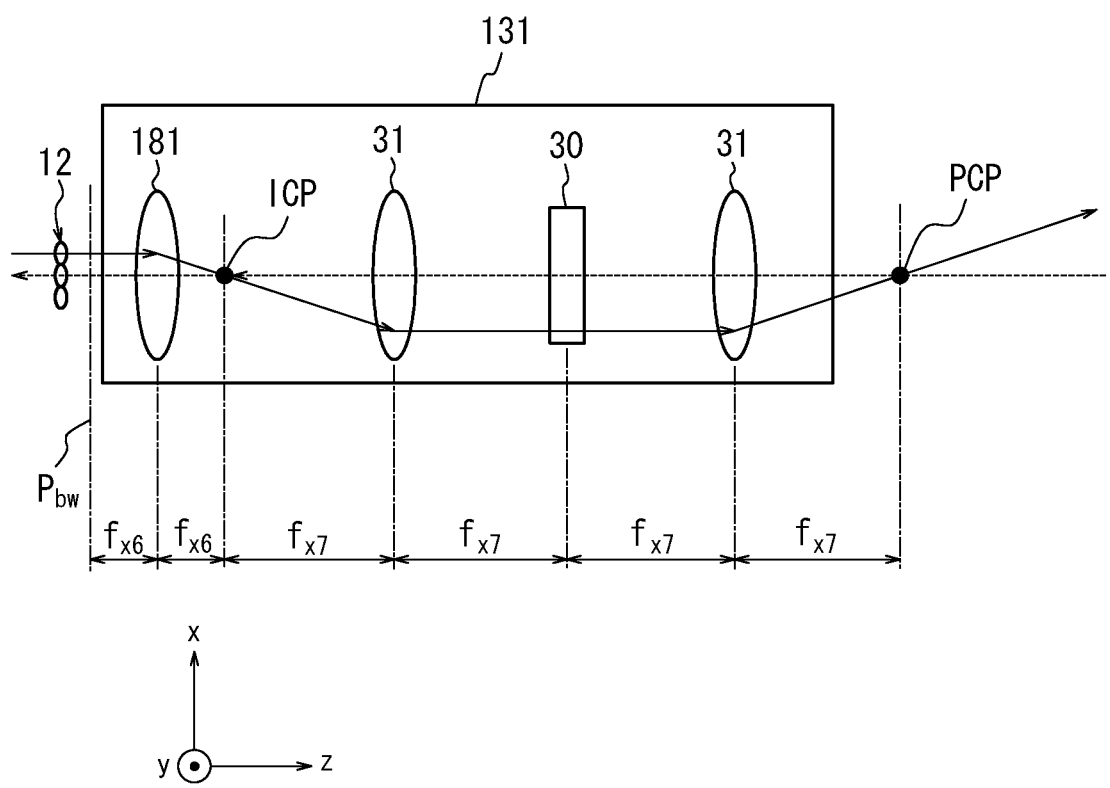
FIG. 18 is a development view of the optical paths in the ovalization relay optical system according to the third embodiment viewed from the plane.

As illustrated in FIG. 16, an ovalization relay optical system 131 is configured by including a first cylindrical mirror 30, a second cylindrical lens 181, and a second cylindrical mirror 31. With reference to FIGS. 17 and 18, description is given of the arrangement or the like of the first cylindrical mirror 30 and the second cylindrical mirror 31. FIG. 17 is a development view of optical paths in the ovalization relay optical system 131 viewed from the side, and FIG. 18 is a development view of the optical paths in the ovalization relay optical system 131 viewed from top.

The first cylindrical mirror 30 is a concave mirror having a refractive power only in the y-axis direction. As illustrated in FIG. 17, the first cylindrical mirror 30 is employed so as to produce the same effect as the first cylindrical lens 170 in the second embodiment, and has a function of condensing, onto a focal point, light beams which are parallel to the optical axis when viewed from the x axis. The first cylindrical mirror 30 is disposed in a position where a distance from the first cylindrical mirror 30 to the primary condensing point PCP becomes equal to the focal length $f_{y6}$ of the first cylindrical mirror 30 in the yz plane.

As in the first embodiment, the second cylindrical lens 181 has a refractive power only in the x-axis direction. The second cylindrical lens 181 is arranged similarly to the second cylindrical lens 18 in the first embodiment. Unlike the first embodiment, the second cylindrical lens 181 is designed so that a focal length $f_{x6}$ of the second cylindrical lens 181 in the xz plane satisfies Expression (12). Here, among the cylindrical lenses each constituting the ovalization relay optical system 131 and each having a refractive power only in the x-axis direction, the second cylindrical lens 181 has a largest refractive power.

$$f_{x6} < 0.225 \times \frac{\lambda \times f_{y6}^2}{\pi \omega_{y1}^2} \qquad (12)$$

The second cylindrical mirror 31 is a concave cylindrical mirror having a refractive power only in the x-axis direction. As illustrated in FIG. 18, the second cylindrical mirror 31 is employed so as to produce the same effect as the third and fourth cylindrical lenses 19 and 20 in the second embodiment, and has a function of condensing, onto a focal point, light beams which are parallel to the optical axis when viewed from the y axis.

As illustrated in FIGS. 16 and 18, the second cylindrical mirror 31 is designed and disposed in a position where a distance from the second cylindrical mirror 31 to each of the intermediate condensing point ICP in the xz plane, the first cylindrical mirror 30, and the primary condensing point PCP becomes all equal to the focal length $f_{x7}$ of the second cylindrical mirror 31 in the xz plane. Therefore, Expression (13) is satisfied.

$$f_{y6} = 2 \times f_{x7} \qquad (13)$$

Similarly to the first embodiment, the wavelength selective switch according to the third embodiment configured as described above is also capable of simultaneously increasing output efficiency while reducing the thickness of the wavelength selective switch 10 at the same time, even with the input/output ports being two-dimensionally arranged. The effect thus produced is described below in detail.

As in the second embodiment, as long as the ratio D/d in the yz plane is smaller than 1.2, the output efficiency of signal light may be increased. Therefore, as in the second embodiment, Expression (14) should be satisfied.

$$\Delta Z < 0.45 \times \frac{\lambda \times f_{y6}^2}{\pi \omega_{y1}^2} \qquad (14)$$

The third embodiment satisfies Expression (13), and hence a distance from the primary condensing point PCP to the intermediate condensing point ICP is equal to a distance from the primary condensing point PCP to the front focal position FFP of the first cylindrical mirror 30. As a result, Expression (15) is satisfied. Therefore, Expression (12) is obtained based on Expressions (14) and (15).

$$\Delta Z = 2 \times f_{x6} \qquad (15)$$

Therefore, when Expression (12) is satisfied, the ratio of the beam diameter D in the y-axis direction at the primary condensing point PCP to the beam waist diameter d in the yz plane, i.e., the ratio D/d, becomes smaller than 1.2. For this reason, the wavelength selective switch according to the third embodiment is also capable of increasing output efficiency of signal light.

Further, according to the third embodiment, unlike the first embodiment, it is only necessary to satisfy Expressions (12), (13) without the need to satisfy Expression (1). Here, Expressions (12) (13) have fewer restrictions as compared to Expression (1), which offers more freedom in designing the aspect ratio of signal light at the primary condensing point PCP. Therefore, the wavelength selective switch 10 can be reduced in thickness.

Further, according to the third embodiment, the third and fourth cylindrical lenses 19, 20 of the first and second embodiments are replaced by the same components in common, which makes it possible to reduce the number of components forming the wavelength selective switch 10.

The present invention has been described based on the drawings and embodiments. However, it should be noted various alterations and modifications may be readily made thereto by a person skilled in the art, based on the present disclosure. Specifically, functions included in the respective members and units may be rearranged without theoretical contradiction, and a plurality of members and units may be combined into one or may be subjected to division. Therefore, those alterations and modifications still fall within the scope of the present invention.

For example, the first to third embodiments described above are each configured so that signal light beams parallel to the optical axis are condensed, in the x-axis direction, onto the intermediate condensing point ICP in the xz plane in each of the ovalization relay optical systems 13, 130, 131, respectively, to thereby make the intermediate condensing point ICP in the xz plane conjugate to the primary condensing point PCP. However, the intermediate condensing point ICP in the xz plane is not limited to one point. There may be arranged a plurality of intermediate condensing points in the x-axis direction which are configured to be relayed so as be conjugate to the primary condensing point PCP. Further, if at least one intermediate condensing point is provided in the x-axis direction, signal light parallel to the optical axis may also be condensed even in the y-axis direction onto the intermediate condensing point in the ovalization relay optical systems 13, 130, 131. Even with this configuration, the aspect ratio of signal light at the primary condensing point PCP may be set to an arbitrary value.

Even when there is provided, separately from the first cylindrical lens 17 in the first embodiment, an optical element having a refractive power only in the y-axis direction, the same effect as in the first embodiment can still be obtained as long as the total of the focal lengths in the yz plane of all the optical elements each having a refractive power only in the y-axis direction coincides with the total of the focal lengths in the xz plane of all the optical elements each having a refractive power only in the x-axis direction Even when there is provided, separately from the first cylindrical lens 170 in the second embodiment, an optical element having a refractive power only in the y-axis direction, the same effect as in the second embodiment can still be obtained as long as the total of the focal lengths of all the optical elements each having a refractive power only in the y-axis direction is smaller than the total of the focal lengths of all the optical elements each having a refractive power only in the x-axis direction.

Even when there is provided, separately from the first cylindrical mirror 30 in the third embodiment, an optical element having a refractive power only in the y-axis direction, the same effect as in the third embodiment can still be obtained as long as the total of the focal lengths in the yz plane of all the optical elements each having a refractive power only in the y-axis direction coincides with a difference between the total of the focal lengths in the xz plane of all the optical elements each having a refractive power only in the x-axis direction and the focal length of an optical element having a maximum refractive power among the optical elements each having a refractive power only in the x-axis direction.

Further, in the first to third embodiments, the micro lens array 12 is disposed. However, the micro lens array 12 does not necessarily have to be disposed.

Further, the ovalization relay optical systems 13, 130, 131 in the first to third embodiments are configured by including optical elements such as cylindrical lenses and cylindrical mirrors each having a refractive power only in one direction. However, even with the use of an optical system having refractive powers in both of the x-axis direction and in the y-axis direction that are largely different from each other, a wavelength selective switch similar to those of the embodiments may still be configured.

Figure 19:
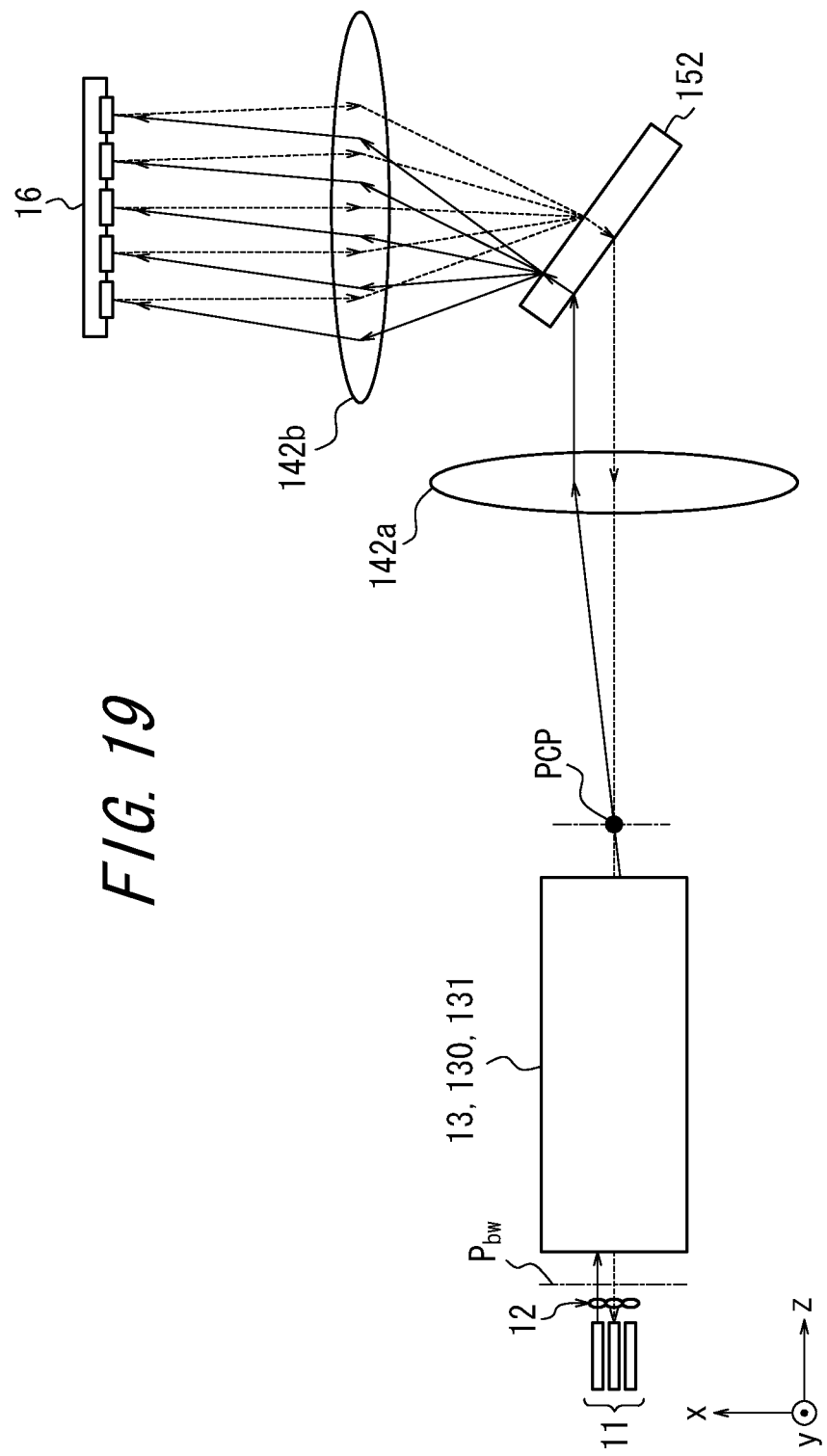
FIG. 19 is a top view illustrating a modified example of the wavelength selective switch according to the first to third embodiments.

Further, the dispersive portion 15, which is configured as a reflective diffraction grating in the first to third embodiments, may also be configured as a transmissive diffraction grating, a Grism, an immersion grating, and a super prism, and also as a combination of a plurality of dispersive elements. Further, in the first to third embodiments, the concave mirror 14 is used to make the primary condensing point PCP and the deflection portion 16 conjugate to each other. However, a member having a light-condensing effect, such as a convex lens and a diffractive-type condenser element, may also be used. For example, as illustrated in FIG. 19, even with the use of a dispersive portion 152, which is a transmissive diffraction grating, and convex lenses 142a, 142b, a wavelength selective switch having the same effect as in the first to third embodiments can still be formed.

Further, the deflection portion 16, which is configured as a MEMS mirror array in the first to third embodiments, may employ other deflection elements such as a liquid crystal element, an optical crystal, and a liquid crystal on silicon (LCOS) as a reflective liquid crystal display panel.

DESCRIPTION OF SYMBOLS 10 wavelength selective switch
11 input/output unit
12 micro lens array
13, 130, 131 ovalization relay optical system
14 concave mirror
15, 152 dispersive portion
16 deflection portion
17 first cylindrical lens
18, 181 second cylindrical lens
19 third cylindrical lens
20 fourth cylindrical lens
30 first cylindrical mirror
31 second cylindrical mirror
ICP intermediate condensing point
$P_{bw}$ forming plane
PCP primary condensing point

The invention claimed is:

1. A wavelength selective switch, comprising:
an input/output unit including a plurality of input/output portions arranged two-dimensionally for inputting or outputting wavelength-multiplexed signal light;
a dispersive portion capable of dispersing, along a first plane, the signal light input from the input/output portion in a direction corresponding to the wave length;
a deflection unit having a plurality of deflection elements for deflecting each of a plurality of signal light beams that are to be dispersed by the dispersive portion into wavelengths, so that the signal light beams are each made incident on different one of the input/output portions depending on the wavelength; and
an ovalization relay optical system disposed between the input/output unit and the dispersive portion, the ovalization relay optical system including at least one first ovalization optical element and at least one second ovalization optical element, the first ovalization optical element having a refractive power in a first direction perpendicular to an optical axis which is larger than a refractive power in a second direction perpendicular to the optical axis and to the first direction, the second ovalization optical element having a refractive power in the second direction which is larger than a refractive power in the first direction, the first ovalization optical element and the second ovalization optical element being arranged so that the first direction becomes perpendicular to the first plane,
the ovalization relay optical system condensing signal light beams that are to be input from all the input/output portions, onto a first conjugate point, the first conjugate point being closer to the ovalization relay optical system between the deflection unit and the ovalization relay optical system, than any other conjugate points that are conjugate to the deflection unit;
the ovalization relay optical system making a beam waist forming position along the first direction of signal light beams emitted from the ovalization relay optical system to the dispersive portion side coincide to the first conjugate point;
the ovalization relay optical system condensing, in the second direction, the signal light beams that are to be input from all the input-output portions onto the first condensing point in the ovalization relay optical system, and making the first condensing point conjugate to the first conjugate point; and
the ovalization relay optical system ovalizing a beam shape of the signal light beams being incident on the deflection element.

2. The wavelength selective switch according to claim 1, wherein the signal light beams incident on the deflection element has an ovalized beam shape in which a ratio of a length along the first direction of the beam shape to a length along the first plane of the beam shape is 2 or more.

3. The wavelength selective switch according to claim 1, wherein the ovalization relay optical system includes at least three of the second ovalization optical elements.

4. The wavelength selective switch according to claim 1, wherein the total of focal lengths, in a second plane perpendicular to the second direction, of all the first ovalization optical elements included in the ovalization relay optical system is substantially equal to the total of the focal lengths, in the first plane, of all the second ovalization optical elements included in the ovalization relay optical system.

5. The wavelength selective switch according to claim 1, wherein the ovalization relay optical system includes a larger number of the second ovalization optical elements than the first ovalization optical elements.

6. The wavelength selective switch according to claim 1, wherein, when all the first ovalization optical elements included in the ovalization relay optical system each have a focal length in a second plane perpendicular to the second direction that brings the total focal length of $f_1$, all the second ovalization optical elements included in the ovalization relay optical system each have a focal length in the first plane that brings the total focal length $f_2$, the signal light have a wavelength $\lambda$, and the signal light has a beam radius $\omega$ in the first direction at the first conjugate point, the following Expression is satisfied:

$$|f_1 - f_2| < 0.45 \times \frac{\lambda \times f_1^2}{\pi \omega^2}.$$

7. The wavelength selective switch according to claim 6, wherein a first total as the total of the focal lengths, in the second plane, of all the first ovalization optical elements included in the ovalization relay optical system is shorter than a second total as the total of the focal lengths, in the first plane, of all the second ovalization optical elements included in the ovalization relay optical system.

8. The wavelength selective switch according to claim 7, wherein a difference between the second total and a maximum focal length of a second ovalization optical element among all the second ovalization optical elements included in the ovalization relay optical system is substantially equal to the first total.

9. The wavelength selective switch according to claim 8, wherein, when a second ovalization optical element having a maximum refractive power in the second direction, among all the second ovalization optical elements included in the ovalization relay optical system, has a focal length $f_3$, the following Expression is satisfied:

$$f_3 < 0.225 \times \frac{\lambda \times f_1^2}{\pi \omega^2}.$$

10. The wavelength selective switch according to claim 1, wherein at least one of the first ovalization optical element and the second ovalization optical element is a cylindrical lens or a cylindrical mirror.

\* \* \* \* \*